Jan. 4, 1966 J. N. GOLDMAN ETAL 3,227,137
SANITARY CONTAINER LINER AND METHOD FOR MAKING SAME
Filed April 17, 1964 2 Sheets-Sheet 1

INVENTORS
JEROME NORMAN GOLDMAN
MARVIN ALAN GOLDMAN
JERRY ROSEN
BY EDITH T. GRILL
ATTORNEY

United States Patent Office 3,227,137
Patented Jan. 4, 1966

3,227,137
SANITARY CONTAINER LINER AND METHOD FOR MAKING SAME
Jerome Norman Goldman, 9322 Ave. B, Brooklyn, N.Y.; and Marvin Alan Goldman and Jerry Rosen, both of 79—19 149th Ave., Howard Beach, N.Y.
Filed Apr. 17, 1964, Ser. No. 360,638
2 Claims. (Cl. 119—1)

This invention relates to a liner for a sanitary container or commode to be used by animals in the home or the like.

An object of the invention is to provide a liner for a sanitary container or commode which will be neat in appearance and which will effectively eliminate the distasteful necessity for cleaning the litter pan of the litter material normally contained therein without impairing the accessibility of the commode arrangement to an animal, such as a cat. Additionally, the liner will be attractive to cats and is easily disposable with the litter material after suitable use.

A further object is to provide a liner which is light, inexpensive and may be easily positioned within the commode container. By constructing the liner material from a plastic such as polyethylene the liner will be essentially waterproof. After use the liner may be removed from the commode and easily formed into a bag containing the dirty litter material which may be suitably tied at the mouth thereof and finally disposed in a suitable manner.

Another object pertains to the fabrication of a liner of the present invention.

The foregoing objects can be accomplished by providing a liner which when properly disposed in a rectangular box comprising the commode produces a general rectangular configuration having a closed bottom and four upright side walls as hereinafter described. By employing a commode container having walls of a vertical dimension less than that of the liner the liner will extend above the container walls so that they may be folded thereover giving protection to the container walls on both sides thereof, and the liner will be adjustable and conform to different depths of containers without slipping.

In order to provide further elucidation of the concepts of the present invention, a more detailed description of the nature of the present invention is set forth in the following which should be considered in conjunction with the drawings wherein like reference numerals refer to like parts throughout.

Figure 1:
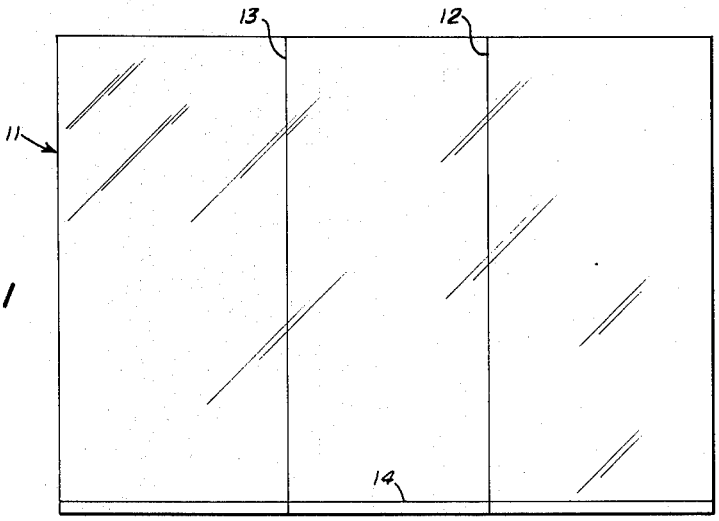
FIGURE 1 is a front elevation of the liner of the present invention in a preliminary position.
Figure 2:
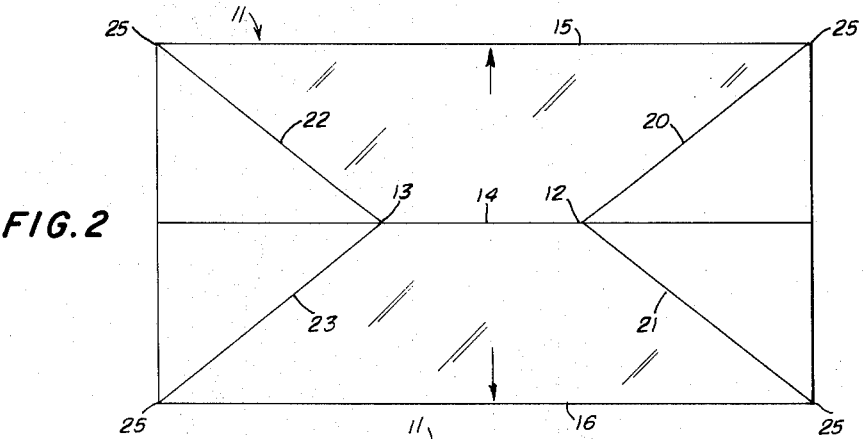
FIGURE 2 is a top view of the liner of the present invention in a partially opened condition showing the various folds.
Figure 3:
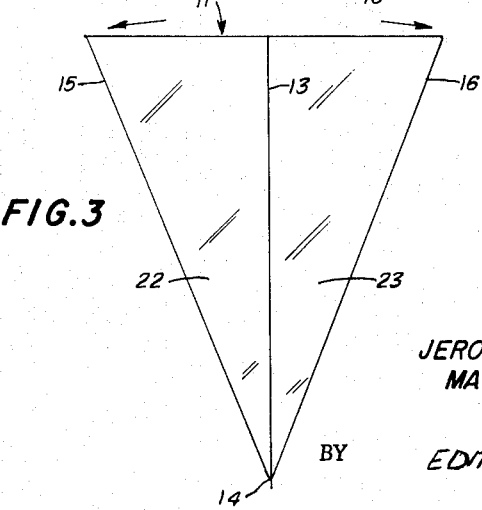
FIGURE 3 is a side elevation of the liner of the present invention in the intermediate position shown in FIGURE 2.
Figure 4:
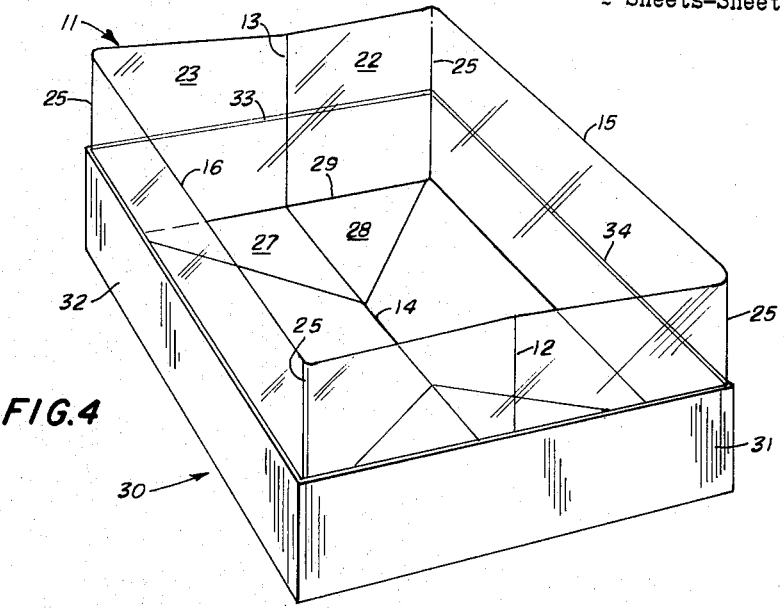
FIGURE 4 shows the liner of the present invention positioned in a rectangular commode with the liner walls extending vertically therefrom.

Now, turning to FIGURE 1 of the drawings, attention is directed to the front view of the liner of the present invention shown generally as 11. It is pointed out that the liner is produced from a thermoplastic material such as polyethylene or polypropylene. Specifically, the liner is fabricated from a long tubular section of the thermoplastic material. The material is folded inwardly at opposite sides for approximately one-third of the total diameter of the tube to give a fold 12 on one side and 13 on the other. After the folds 12 and 13 have been made the tubular arrangement is compressed and a seam, by heating means, is made along substantially the bottom edge as at 14. The individual liner is then cut from the tubular section. For a further understanding of the liner of the present invention, attention is now directed to FIGURE 2 which shows the liner in a partially open condition. It will be appreciated as front and rear walls 15 and 16 are moved apart, thereby exposing the heat sealed seam 14, triangular configurations are produced which result in further folds directed towards the bottom that are produced as the liner is opened. For instance, since the inwardly folded portions 20 and 21 on one side and 22 and 23 on the other are heat sealed along the bottom they will resist a spreading apart as the top portion of the liner of walls 15 and 16 are moved away from each other. As this occurs corners are produced as can be seen at 25. At the same time further folds are made between the seam 14 and the corners 25 diagonally along walls 20, 21, 22, and 23. These folds extend from the top of corner 25 to the folds 12 and 13, respectively, as they abut seam 14. A further view of this can be seen from FIGURE 3 which shows front and rear walls 15 and 16 being moved apart through the initial steps. It will be appreciated that during this initial movement the liner forms a configuration having a general triangular configuration. Additionally, fold 13 begins at the forwardmost portion of liner as viewed in FIGURE 3 and extends diagonally inwardly to a position shown as in FIGURE 1 abutting seam 14. Further opening of the liner results in the configuration shown in FIGURE 4. It will now be noted that, for instance, fold 13 has been completely moved outwardly from its initial position as shown in FIGURE 1 except for the portion heat sealed along seal 14. Additionally, the side walls 23 and 22 of the fold now become the side walls of the liner while a portion thereof of each is folded flat along a horizontal plane to produce triangular portions of the bottom as at 27 and 28 with a new perpendicular fold 29. In FIGURE 4 the opposite side of the liner has a similar configuration where fold 12 becomes a part of the opposite side wall. The liner has such a squared or rectangular configuration that it may be easily fitted into the container or commode shown generally as at 30. This container has side walls 31 and 32 as can be seen as well as side walls 33 and 34 as can be seen through the thermoplastic liner. It will be further noted that the vertical walls of the liner extend beyond the side walls 31, 32, 33 and 34 of the commode which gives the liner support.

Figure 5:
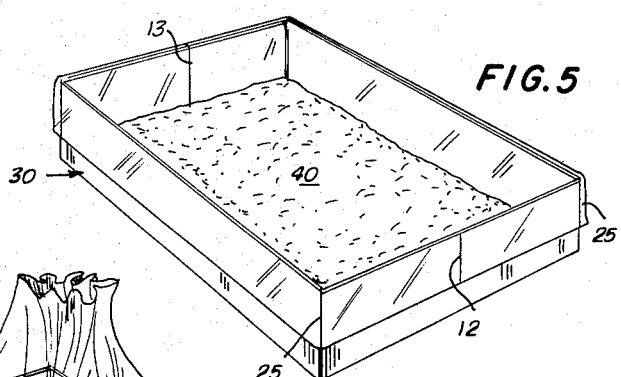
FIGURE 5 is a perspective of the liner and commode wherein the liner has been suitably positioned to encompass the side walls of the commode.

In FIGURE 5 that portion of the liner extending beyond the commode 30 is then folded over the edges of the commode and downwardly on the outer peripheral side. In this position the liner provides additional protection and prevents slipping by the cat pulling on it. In other words, the liner now encompasses all or practically all portions of the commode and protects it from the usual cat activities. The folded portion provides extra room to insure the adaptability of the liner to variations in the heights of the commodes. In FIGURE 5 it will be seen that the liner contains litter 40 which may be of any suitable material such as absorbent clay products, sawdust or torn pieces of paper which may or may not be treated in order to provide disinfectants as well as deodorants as is usual in the use of cat litter.

Figure 6:
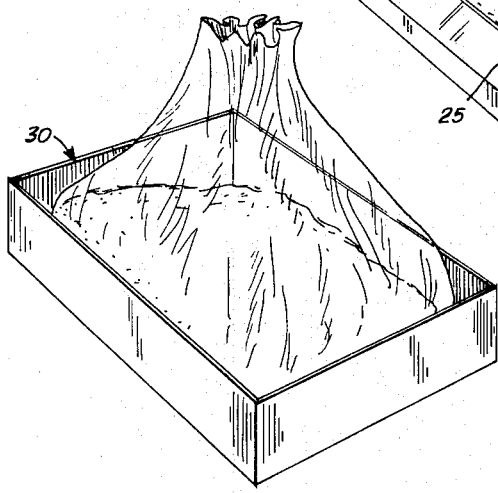
FIGURE 6 is a perspective view of the liner of the present invention in a position ready for removal from the commode for final disposition.

Finally, after the unit has been set up as shown in FIGURE 5 for a period of time and the material, that is, the litter has been employed in the usual manner by cats or other animals, the litter material may be retrieved from the commode 30 by forming a bag having the general configuration, as shown in FIGURE 6, simply by removing the folded encompassing portions from around the commode and then bringing these vertical side walls of the liner together in a bunching operation as in the case utilized for closing the usual paper bag or the like. The bag in the position shown in FIGURE 6 may then be tied along the mouth thereof thereby completely enclosing the contents of the litter and may then be removed from the supporting commode structure for final disposal.

It will be appreciated that the structural commode is now in a ready position to accept a new liner which may be positioned in the manner indicated in the above.

An additional feature of the present invention is to apply a coating to the liner material which coating may be both a disinfectant and deodorant thereby imparting to the bag a further protection against infection resulting from the use of the litter material in the liner.

It has been found that the liners of the present invention may be suitably packaged by producing a number of further fold-overs of the liner when in the position shown in FIGURE 1. When the liner assumes a final folded condition it is packaged in a rectangular cardboard box for commercialization and merchandising.

It will be apparent that many changes and modifications of the several features described herein may be made without departing from the spirit and scope of the invention. It is therefore apparent that the foregoing description is by way of illustration of the invention rather than limitation of the invention.

What is claimed is:

1. A method for fabricating a disposable liner for an animal commode which comprises: producing two oppositely positioned inwardly extending folds in a long tube of waterproof thermoplastic film, compressing said folds and said tube; heat sealing transversely a portion of said tube along spaced portions of said tube; and then cutting said tube proximate said heat sealed portions to form separate commode liners, thereafter opening one of said separate commode liners and shaping said liner into a rectangular configuration; positioning said liner in a rectangular animal commode receptacle having side walls; and folding extending portions of said liner over said side walls of said receptacle, thereby covering substantially all exposed portions of said receptacle with said liner.

2. A lined animal commode comprising: a rectangularly shaped animal commode receptacle having side walls and open at the top; a disposable waterproof thermoplastic liner in said receptacle, said liner having a rectangularly shaped planar bottom and side walls, said bottom including double thickness folds of said liner forming isoceles triangle configurations with the bases thereof positioned along the lower portion of two parallel sides of said receptacle, said liner having side walls of a vertical dimension substantially greater than the side walls of said receptacle; and said side walls of said liner being folded over the side walls of said receptacle to substantially cover both sides thereof.

References Cited by the Examiner

UNITED STATES PATENTS

| | | | |
|---|---|---|---|
| 1,926,986 | 9/1933 | Angier | 217—3 |
| 2,149,412 | 3/1939 | Bangs | 62—91 |
| 2,894,675 | 7/1959 | Stein | 229—53 |
| 3,022,605 | 2/1962 | Reynolds | 47—58 |
| 3,104,797 | 9/1963 | Langenfeld | 229—53 |
| 3,154,052 | 10/1964 | Sweeney | 119—1 |
| 3,162,353 | 12/1964 | Sylvester et al. | 119—1 |

OTHER REFERENCES

Modern Packaging Encyclopedia, pp. 265–266, issue 1961.

SAMUEL KOREN, *Primary Examiner.*

ALDRICH F. MEDBERY, *Examiner.*